United States Patent
Noguchi et al.

(10) Patent No.: US 6,453,234 B1
(45) Date of Patent: Sep. 17, 2002

(54) VEHICLE MOUNTED NAVIGATION APPARATUS WITH FAST RENEWAL TIMING

(75) Inventors: Masaki Noguchi; Hitoshi Igarashi; Noriyuki Abe; Fukuya Iguchi; Ryoko Seki; Toru Nishikawa, all of Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/869,244

(22) PCT Filed: Aug. 23, 2000

(86) PCT No.: PCT/JP00/07395

§ 371 (c)(1),
(2), (4) Date: Jun. 27, 2001

(87) PCT Pub. No.: WO01/31296

PCT Pub. Date: May 3, 2001

(51) Int. Cl.$^7$ ................................................. G06K 9/00
(52) U.S. Cl. ....................... 701/208; 340/990; 73/178 R
(58) Field of Search ................................ 701/208, 200; 340/990, 989, 995, 993; 73/178 R

(56) References Cited

U.S. PATENT DOCUMENTS

| | | | | |
|---|---|---|---|---|
| 4,489,389 A | * | 12/1984 | Beckwith et al. | 340/988 |
| 4,660,157 A | * | 4/1987 | Beckwith et al. | 345/421 |
| 4,763,270 A | * | 8/1988 | Itoh et al. | 340/988 |
| 4,782,447 A | * | 11/1988 | Ueno et al. | 340/995 |
| 4,876,651 A | * | 10/1989 | Dawson et al. | 340/995 |
| 5,297,051 A | * | 3/1994 | Arakawa et al. | 340/990 |
| 5,345,388 A | * | 9/1994 | Kashiwazaki | 340/988 |
| 5,396,430 A | * | 3/1995 | Arakawa et al. | 340/990 |
| 5,410,485 A | * | 4/1995 | Ichikawa | 340/995 |
| 5,687,331 A | * | 11/1997 | Volk et al. | 345/823 |

FOREIGN PATENT DOCUMENTS

| | | |
|---|---|---|
| JP | 5-99678 | 4/1993 |
| JP | 7-105493 | 4/1995 |
| JP | 7-301538 | 11/1995 |
| JP | 8-5721 | 1/1996 |
| JP | 8016992 | 1/1996 |
| JP | 9-126799 | 5/1997 |
| JP | 9-287973 | 11/1997 |
| JP | 11-240355 | 9/1999 |
| JP | 11-295083 | 10/1999 |

* cited by examiner

Primary Examiner—William A. Cuchlinski, Jr.
Assistant Examiner—Olga Hernandez
(74) Attorney, Agent, or Firm—McDermott, Will & Emery

(57) ABSTRACT

There are provided a first navigation unit (transmitting side unit) 10 having a reader 13 for reading at least map data from a map information storage medium 14 and a controller 15 for controlling a system, and a second navigation unit (receiving side unit) 40 having a controller 41 connected to the control unit 15 through a serial communication line 30, buffer memories 42, 46 for storing therein image data from the reader 13, a display image memory 43 for extracting and copying the data in the range required for displaying from the map data developed on the buffer memories 42, 46, and a display controller 44 for displaying the image data on a display 45. The image data (transfer information) with an identification number of a detailed image concerning a rout selecting point approaching just before is stored in the buffer memory 46 with an enough time margin. At a determined display timing, display command information including the identification number is transmitted from the controller 15 to the controller 41 so that the display unit 45 displays the detailed image based on the image data.

6 Claims, 4 Drawing Sheets

VEHICLE MOUNTED NAVIGATION APPARATUS WITH FAST RENEWAL TIMING

TECHNICAL FIELD

The present invention relates to a navigation apparatus mounted in a vehicle.

BACKGROUND ART

For example, Japanese Patent Unexamined Publication No. Hei. 8-16992 discloses a navigation apparatus mounted in a vehicle.

As shown in FIG. 4, this includes a receiver 1 for receiving an electric wave from a GPS satellite to output the position data of a present place, a reader 3 for reading map data from a map information storage medium 2 such as a CD-ROM, a buffer memory 4 for storing the map data, a display image memory 5 for extracting and copying a range required for displaying from the map data developed on the buffer memory 4, a display controller 7 for displaying the map data copied in the display image memory 5 on a display unit 6 such as a CRT or an LCD, and a controller 8, such as a micon, for controlling the whole system. The contents of the display image memory 5 are renewed in accordance with the change of the present position, and the display on the display unit 6 is also changed in accordance with this. Incidentally, an input unit 9, such as a keyboard, enabling a user, such as a driver, to perform various operations, such as setting of a start point and an arrival point or recording of traveling data, is connected to the controller 8.

Besides, in Japanese Patent Unexamined Publication No. Hei. 8-5721, another buffer memory 4a is prepared, and map data different from the buffer memory 4 is copied, so that, for example, an intersection approaching ahead can be displayed in detail (for example, enlargement) on the display unit 6.

Now, image data, such as the map data, copied in the buffer memory 4, 4a has a great amount of information, and in the so-called integral-type navigation apparatus in which the distance between the reader 3 as a transmitting side and the buffer memory 4, 4a as a receiving side is short, it is possible to copy and store the image data without much time delay, and a problem in display on the display unit 6 is hard to produce.

However, in the navigation apparatus in which the distance between the reader 3 and the buffer memory 4, 4a is long and transfer is made between them through serial communication, a renewal timing of image data is delayed, and there is a fear that an original display renewal is not made and a suitable display is not carried out. Particularly, in the case where an intersection is displayed in detail as in Japanese Patent Unexamined Publication No. Hei. 8-5721, there is a fear that a display is carried out after passing through the objective intersection.

DISCLOSURE OF THE INVENTION

According to the present invention, a navigation apparatus for a vehicle in which a transmitting side unit and a receiving side unit are installed at positions remote from, each other and both the units are connected to each other through a serial communication line, is characterized by comprising:

the transmitting side unit including at least a present position measuring unit for detecting a present position, a reader for reading transfer information from a map information storage medium, and a first controller for controlling a system and outputting display command information at a predetermined display timing; and the receiving side unit including at least a second controller connected to the first controller through the serial communication line and receiving the display command information, buffer memories for storing the transfer information from the reader and for storing the transfer information related to a route selecting point with an enough time margin, a display image memory for extracting and copying a range required for displaying from the transfer information developed on the buffer memories, and a display controller for displaying a detailed image of the route selecting point based on the transfer information on a display unit by a command from the second controller when the second controller receives the display command information, whereby the renewal timing of the display based on the transfer information is not delayed and an excellent display renewal can be made.

Besides, a navigation apparatus for a vehicle in which a transmitting side unit and a receiving side unit are installed at positions remote from each other and both the units are connected to each other through a serial communication line, is characterized by comprising:

the transmitting side unit including at least a present position measuring unit for detecting a present position, a reader for reading transfer information from a map information storage medium, and a first controller for controlling a system and outputting display command information at a predetermined display timing; and the receiving side unit including at least a second controller connected to the first controller through the serial communication line and receiving the display command information, an input unit for carrying out route setting, buffer memories for storing the transfer information from the reader and for storing the transfer information related to a route selecting point based on the route setting with an enough time margin, a display image memory for extracting and copying a range required for displaying from the transfer information developed on the buffer memories, and a display controller for displaying a detailed image of the route selecting point based on the transfer information on a display unit by a command from the second controller when the second controller receives the display command information, whereby the renewal timing of the display based on the transfer information is not delayed and an excellent display renewal can be made.

Besides, a navigation apparatus for a vehicle in which a transmitting side unit and a receiving side unit are installed at positions remote from each other and both the units are connected to each other through a serial communication line, is characterized by comprising:

the transmitting side unit including at least a present position measuring unit for detecting a present position, a reader for reading transfer information from a map information storage medium, and a first controller for controlling a system and receiving display command information; and the receiving side unit including at least a second controller connected to the first controller through the serial communication line and outputting the display command information, an input unit for carrying out route setting, buffer memories for storing the transfer information from the reader and for storing the transfer information related to a route selecting point based on the route setting, a display image memory for extracting and copying a range required for displaying from the transfer information developed on the buffer memories, and a display controller for outputting the display command, information to the first controller to instruct the buffer memories to store the transfer information related to the route selecting point when the route setting by the input unit is completed, and for displaying a detailed image of the route selecting point based on the transfer information on a display unit at a display timing previously determined by the first controller or based on an operation signal from the input unit, whereby the renewal timing of the display based on the transfer information is not delayed and an excellent display renewal can be made.

Besides, there is a feature that the transfer information read by the reader is map data in the vicinity of the present position, the transfer information stored in one of the buffer memories is image data for displaying the route selecting point by the detailed image, an identification number related to the route selecting point is given to the image data, and the display command information is a command including the identification number, whereby the image data intrinsic to the route selecting point can be previously transferred to the buffer memory, and even in the structure where the image data is transferred through serial communication with a low communication speed, the renewal timing is not delayed, and the display renewal can be made in accordance with the previously determined display timing.

Besides, there is a feature that the transmitting side unit is positioned at a place remote from a driver's seat of the vehicle, and the receiving side unit is positioned in the inside of a meter unit installed in front of the driver s seat. Like this, even in the structure where the transmitting side unit and the receiving side unit are remote from each other, the renewal timing is not delayed, and the display renewal can be made in accordance with the previously determined display timing.

Besides, there is a feature that a controller prepared for controlling the meter unit is also used for the second controller, whereby cost reduction by the common use of parts can be realized.

BEST MODE FOR CARRYING OUT THE INVENTION

The present invention will be described on the basis of an embodiment shown in the attached drawings.

Figure 1:
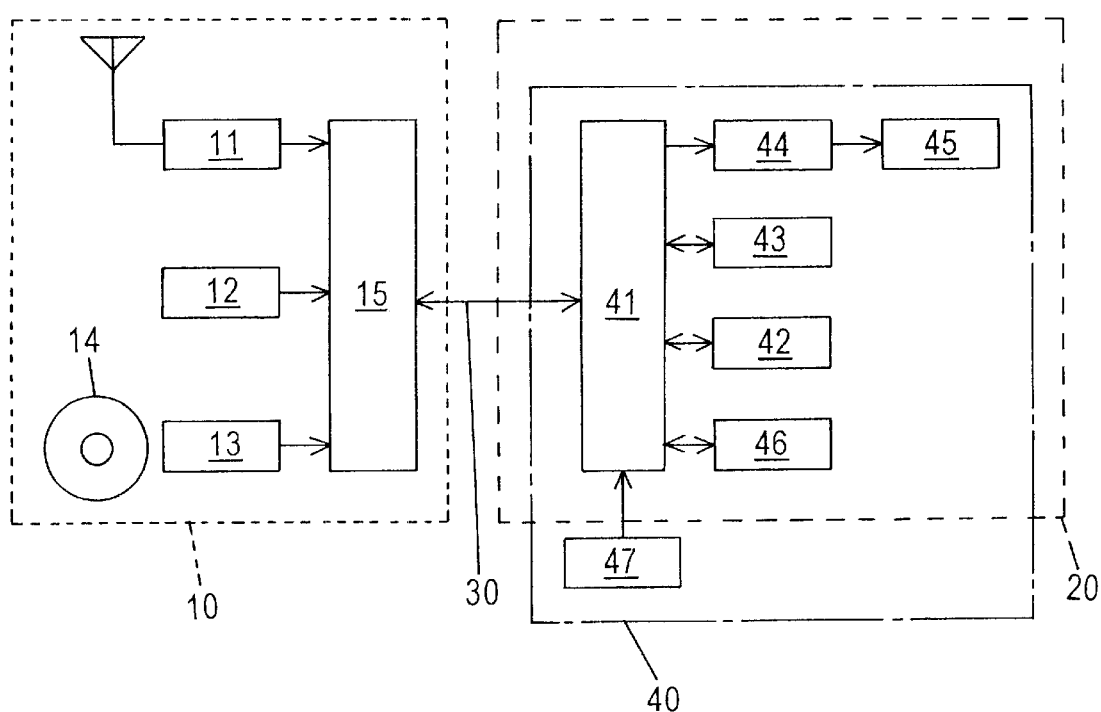
FIG. 1 is a block diagram for explaining the structure of an embodiment of the present invention.

FIG. 1 relates to an embodiment of the present invention, in which reference numeral 11 designates a receiver (present position measuring unit) for receiving an electric wave from a GPS satellite to output position data of a present place of a vehicle A; 12, a detector (present position measuring unit) for detecting the present position by using a vehicle speed sensor, a gyro or the like; 13, a reader for reading map data from a map information storage medium 14 such as a CD-ROM; and 15, a controller, such as a micron, for controlling such a system. The above constitute a first navigation unit (transmitting side unit) 10 and is generally installed at a place remote from a driver's seat, such as a trunk room of the vehicle, and for example, at a place where the electric wave from the GPS satellite can be satisfactorily received.

Reference numeral 20 designates a meter unit which is installed in front of the driver's seat and displays various pieces of information necessary or useful for vehicle traveling to a user such as a driver, and a second navigation unit (transmitting side unit) 40 connected to the first navigation unit 10 through a serial communication line 30 is incorporated in the inside of the meter unit 20.

Reference numeral 41 designates a controller, such as a micon, connected to the controller 15 of the first navigation unit 10 through the serial communication line 30 and making control to display an image; 42, a buffer memory for storing the map data (transfer information) from the reader 13; 43, a display image memory for extracting and copying a range required for displaying from the map data developed on the buffer memory 42; and 44, a display controller for displaying the map data copied in the display image memory 43 on a display unit 45 such as a CRT or an LCD. The above constitute the second navigation unit 40, the contents of the display image memory 43 are renewed in accordance with the change of the present position, and the display on the display unit 45 is also changed in accordance with this.

Besides, in the second navigation unit 40, another buffer memory 46 is prepared, and by copying image data (transfer information) different form the buffer memory 42, a route selecting point is displayed in detail on the display unit 45, for example, an intersection is enlarged and is displayed.

Incidentally, an input unit 47, such as a keyboard, which enables the user, such as the driver, to perform various operations, for example, setting (route setting) of a start point and an arrival point, or recording of traveling data, is connected to the controller 41. Besides, a micon as a controller prepared for controlling the meter unit 20, which is not dedicated for the second navigation unit 40, may also be used for the controller 41, and in this case, cost reduction by the common use of parts can be realized.

Figure 2:
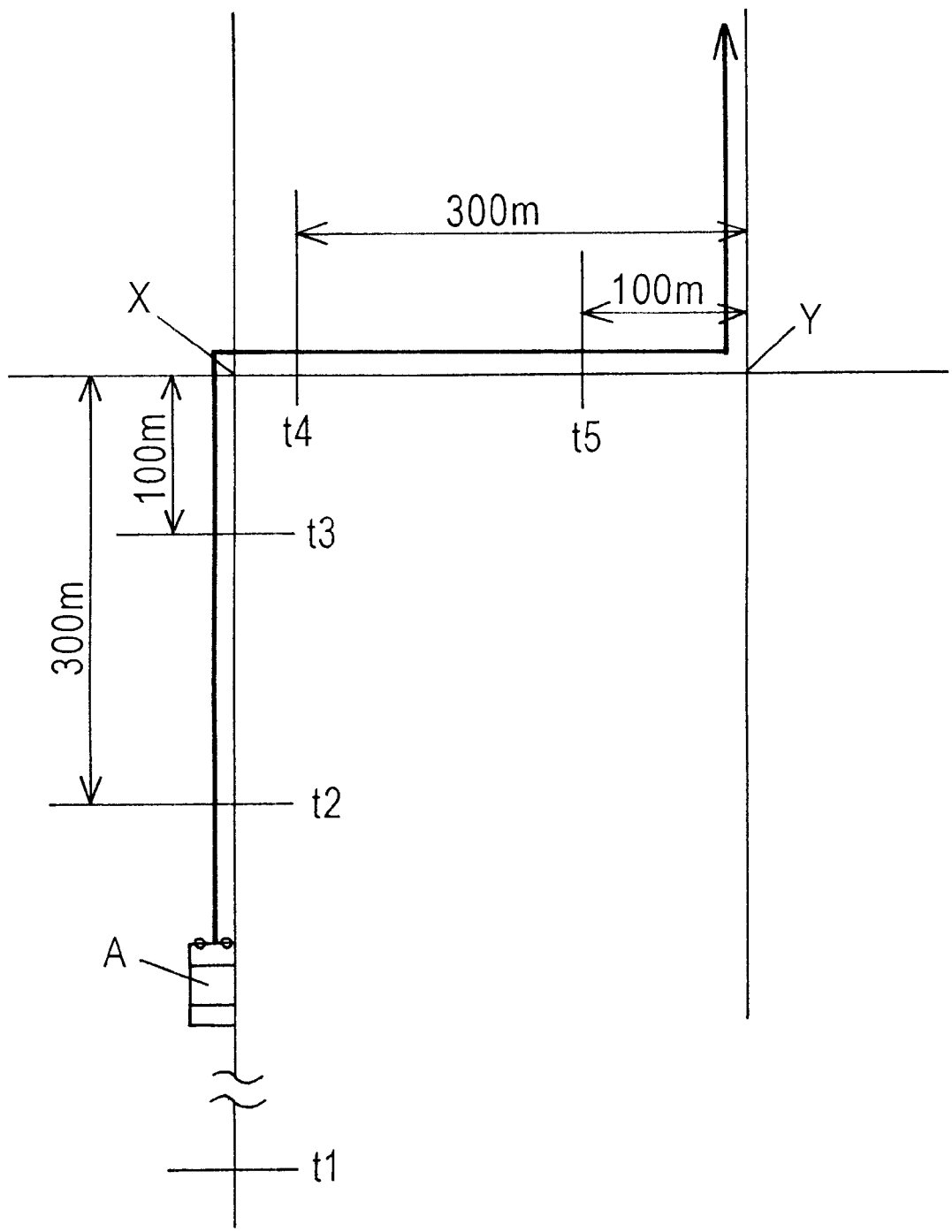
FIG. 2 is a schematic explanatory view for explaining the operation of the above.
Figure 3:
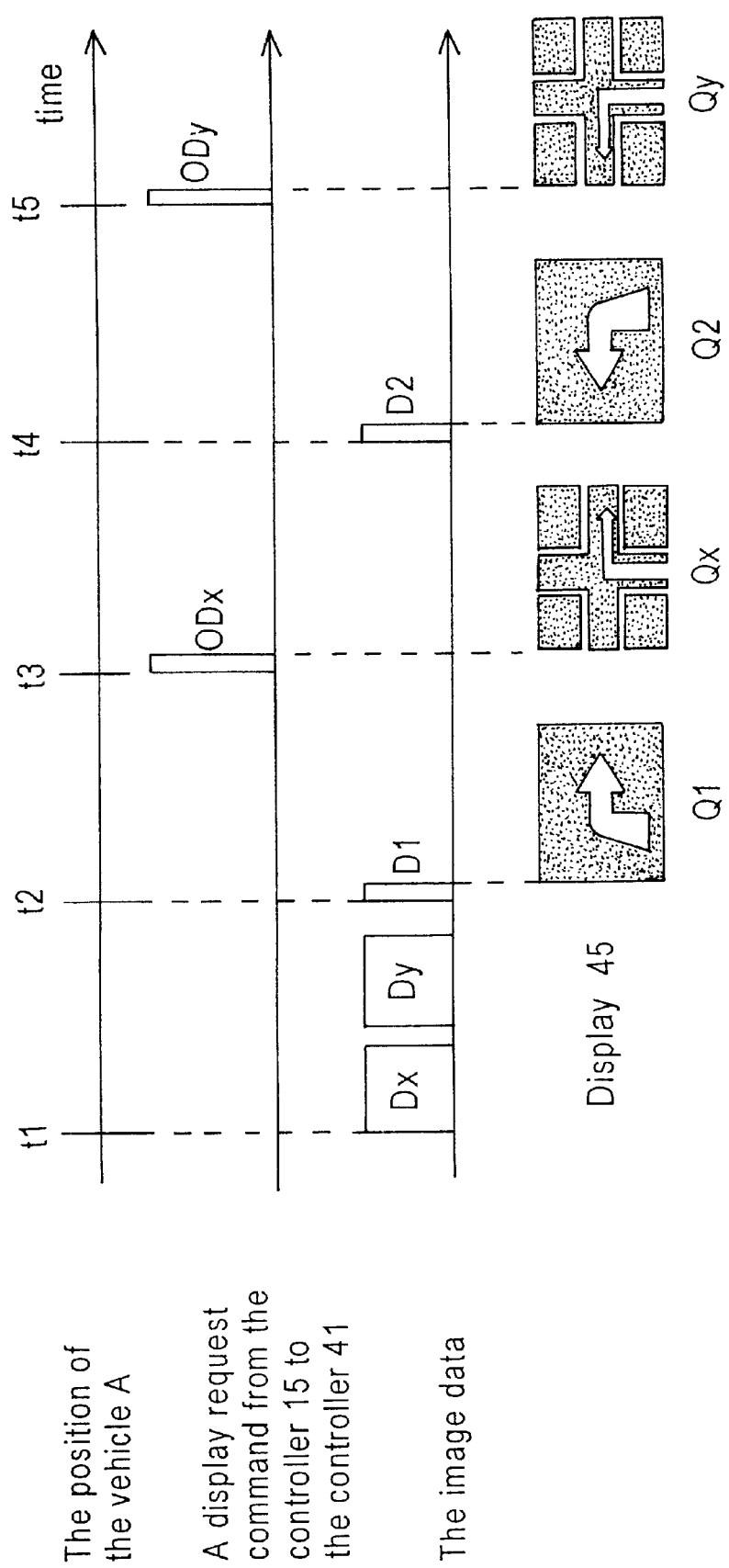
FIG. 3 is a time series explanatory view for explaining the transfer of image data of the above and display renewal.
Figure 4:
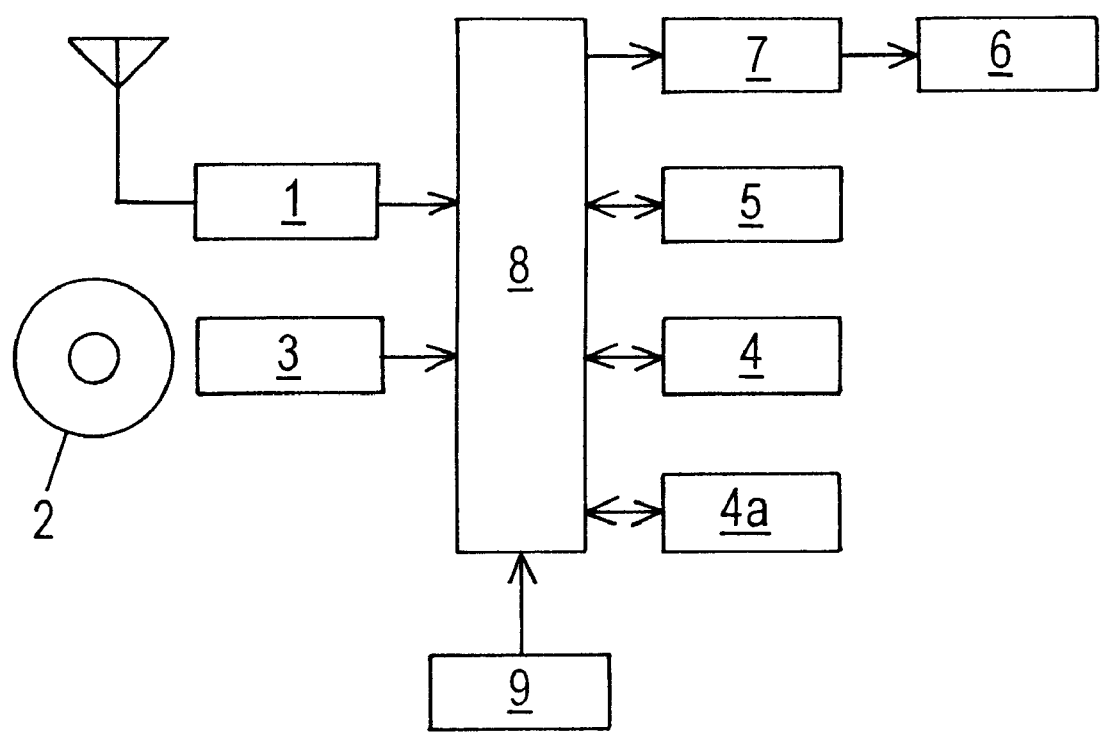
FIG. 4 is a block diagram for explaining the structure of the prior art.

In the navigation apparatus like this, the transfer of the transfer information in the case where the user of the vehicle A uses the input unit 47 to set a route of turning to the right at an intersection X just before the vehicle and turning to the left at a next intersection Y (that is, a route shown in FIG. 2), will be described with reference to FIGS. 2 and 3.

The controller 15 calculates the present position of the vehicle A on the basis of the information from the receiver 11 and the detector 12, the reader 13 reads the map data from the map information storage medium 14 in accordance with this, and the controller 15 of the first navigation unit 10 transfers it to the controller 41 of the second navigation unit 40 through the serial communication line 30. The transferred map data is stored in the buffer memory 42, the display image memory 43 extracts and copies the range required for displaying from the map data developed on the buffer memory 42, and the map data copied in the display image memory 43 is displayed by the display controller 44 on the display unit 45. The contents of the display image memory 43 are renewed in accordance with the change of the present position, and the display on the display unit 45 is also changed in accordance with this.

In general, the map data for several screens including peripheral areas of a screen display area is stored in the buffer memory 42, and quick map scroll is made possible. On the other hand, although image data related to a route selecting point requiring selection in the traveling direction, such as an intersection approaching just before, is stored in the buffer memory 46, the controller 15 measures the distance between the present position of the vehicle A and the objective place, and this image data is controlled to be stored in the buffer memory 46 with an enough time margin.

In the case where the distance to the route selecting point is within a certain distance (for example, 300 meters) during the traveling of the vehicle A, a simple figure for guiding the driver to the traveling direction at the route selecting point is displayed on the display unit 45. For example; simple images Q1 and Q2 in which arrows indicating a turn to the right and a turn to the left as the traveling directions are designed, are displayed at a point t2 300 meters distant from the intersection X as the route selecting point and at a point t4 300 meters distant from the intersection Y as the route selecting point, respectively. Image data D1 and D2 related to the simple images Q1 and Q2 have a capacity of about several tens kilobytes, and even in the navigation apparatus having the structure in which the distance between the reader 13 as the transmitting side and the buffer memory 46 as the receiving side is long, a time delay does not occur in the transfer, and even if they are transferred every time at the respective points t2 and t4 from the reader 13 to the buffer memory 46, there does not occur a problem in the display operation on the display unit 45.

When the distance between the vehicle A and the route selecting point is at a predetermined display timing, for example, within a certain distance (for example, 100 meters), a detailed image for guiding the driver to the traveling direction at the route selecting point is displayed on the display unit 45. For example, detailed images Qx, Qy in which the road shapes of the intersections X and Y and arrows indicating a turn to the right and a turn to the left as the traveling directions are designed, are displayed at a point t3 100 meters distant from the intersection X as the route selecting point and at a point t5 100 meters distant from the intersection Y as the route selecting point. The capacity of the image data with respect to the detailed images Qx and Qy is several hundred kilobytes to several megabytes, and in the navigation apparatus having the structure in which the distance between the reader 13 as the transmitting side and the buffer memory 46 as the receiving side is long, there is a fear that a time delay occurs in the transfer, that is, if they are transferred from the reader 13 to the buffer memory 46 every time at the respective points t3 and t5, there occurs such a problem that they are displayed on the display unit 15 after passing through the intersections X and Y, as described before.

In order to solve this, when the controller 15 detects the route selecting points within a certain distance (for example, 1 kilometer) in the traveling direction of the vehicle A, image data Dx and Dy of the detailed images Qx and Qy with respect to the route selecting points are previously transferred from the reader 13 to the buffer memory 46 as the receiving side. That is, when it is detected at a point t1 that there are intersections X and Y as the route selecting points within 1 kilometer in the traveling direction of the vehicle A, the image data Dx and Dy (data intrinsic to the route selecting points) of the detailed images Qx and Qy in which the road shapes of the intersections X and Y and the arrows indicating a turn to the right and a turn to the left as the traveling directions are designed, are transmitted.

The image data Dx and Dy are intrinsic contents of combination of the intersections X and Y and the traveling directions based on the route setting at the intersections X and Y, and intrinsic identification numbers IDx and IDy are added to the respective image data Dx and Dy.

From the above structure, when the vehicle A passes through the point t1, the image data Dx and Dy with the identification numbers IDx and IDy are transferred from the reader 13 to the buffer memory 46 as the receiving side.

When the vehicle A passes through the point t2, the image data D1 is transferred as described above, and the display unit 45 displays the simple image Q1.

When the controller 15 judges that the vehicle A has passed through the point t3, the controller 15 outputs a display request command (display command information) ODx having the content of "display the image Qx with IDx" to the controller 41 so that the image Qx is displayed on the display unit 45, and the controller 41 receiving this gives the command to the display controller 44, so that the detailed image Qx is displayed on the display unit 45 until the vehicle passes through the intersection X.

When passing through the intersection X, the display unit 45 suitably carries out a desired display, and when the vehicle A passes through the point t4, the image data D2 is transferred as described before, and the simple image Q2 is displayed on the display unit 45.

When the controller 15 judges that the vehicle A has passed through the point t5, the controller 15 outputs a display request command (display command information) ODy having the content of "display the image Qy with IDy" to the controller 41 so that the image Qy is displayed on the display unit 45, and the controller 41 receiving this gives the command to the display controller 44, so that the detailed image Qy is displayed on the display unit 45 until the vehicle passes through the intersection Y.

Like this, the image data intrinsic to the route selecting point is previously transferred to the buffer memory 46 and is displayed on the display unit 45 based on the display request command appearing at the actual display timing, so that even in the navigation apparatus in which the distance between the reader 13 and the buffer memory 46 is long and the transfer is made between them through the serial communication with a low communication speed, the renewal timings of the image data D1 and D2 are not delayed on the display unit 45, and the renewal of the display can be properly made in accordance with the predetermined display timing.

Incidentally, the present invention is not limited to the foregoing structure, and for example, as the image data transferred to the buffer memory 46, not the road shape of the intersection as the route selecting point, but image information (picture) of the intersection or character information (memo such as an address or a telephone number) may be adopted. Alternatively, map data adjacent to map data stored in the buffer memory 42 or map data having a different scale from the presently displayed area stored in the buffer memory 42 may be adopted, and it is needless to say that if the image data of the buffer memory 46 is map data different from the map data of the buffer memory 42, the above structure can be applied.

Besides, a structure may be adopted in which the transmitting side unit 10 includes at least the present position measuring unit such as the receiver 11 or the detector 12, the reader 13, and the first controller 15 for controlling the system and receiving display command information, and the receiving side unit 40 includes at least the second controller 41 connected to the first controller 15 through the serial communication line 30 and outputting the display command information, the input unit 47 for carrying out route setting, the buffer memory 46 for storing the transfer information from the reader 13 and for storing the transfer information with respect to the route selecting point based on the route setting, the display image memory 43 for extracting and copying the range required for displaying from the transfer information developed on the buffer memory 46, and the display controller 44 for instructing the buffer memory 46 to store the transfer information related to the route selecting point by outputting the display command information to the first controller 15 when the route setting by the input unit 47 is completed and for causing the display unit 45 to display, based on a display timing previously determined by the first controller 15 or an operation signal from the input unit 47, the detailed image of the route selecting point based on the transfer information.

That is, according to this embodiment, the image data Dx and Dy of the transfer information with respect to the detailed images Qx and Qy of the intersections X and Y as the route selecting points from the reader 13 of the transmitting side unit 10 starts to be transferred by the display command information ODx and ODy (only one signal may be used) from the second controller 41 of the receiving side unit 40, which is outputted when the route setting by the input unit 47 is completed. In the foregoing embodiment, although it is transferred by the instruction of the transmitting side unit 10, this embodiment is different in the structure that it is transferred by the instruction of the receiving side unit 40.

According to such structure, when the route setting by the input unit 47 is completed, in general, the transfer of the image data Dx and Dy with respect to the detailed images Qx and Qy of the intersections X and Y starts from the time of the end of the route calculation of the route setting, so that an enough time margin can be secured until the detailed images Qx and Qy are displayed, and therefore, the renewal timing of the display is not delayed, and the excellent display renewal can be made, and in addition, even in the case where the intersections X and Y are considerably distant, when the transfer of the image data Dx and Dy has been already completed, the detailed images Qx and Qy based on that can be displayed, so that the convenience is improved, for example, it is possible to display in accordance with the preference of the user such as the driver.

Industrial Applicability

As described above, according to the present invention, even in the navigation apparatus in which the distance between the transmitting side unit including the reader and the receiving side unit including the buffer memory is long, and image data is transferred between them through serial communication, the renewal timing of the display based on the transfer information is not delayed, and the excellent display renewal can be made.

What is claimed is:

1. A navigation apparatus for a vehicle in which a transmitting side unit and a receiving side unit are installed at positions remote from each other and both the transmitting side unit and the receiving side unit are connected to each other through a serial communication line, the navigation apparatus characterized by comprising:

the transmitting side unit including at least a present position measuring unit for detecting a present position, a reader for reading transfer information from a map information storage medium, and a first controller for controlling system and outputting display command information at a predetermined display timing; and the receiving side unit including at least a second controller connected to the first controller through the serial communication line and receiving the display command information, buffer memories for storing the transfer information from the reader and for storing the transfer information related to a route selecting point with enough time margin, a display image memory for extracting and copying a range required for displaying from the transfer information developed on the buffer memories, and a display controller for displaying a detailed image of the route selecting point based on the transfer information on a display unit by a command from the second controller when the second controller receives the display command information.

2. A navigation apparatus for a vehicle in which a transmitting side unit and a receiving side unit are installed at positions remote from each other and both the transmitting side unit and the receiving side unit are connected to each other through a serial communication line, the navigation apparatus characterized by comprising:

the transmitting side unit including at least a present position measuring unit for detecting a present position, a reader for reading transfer information from a map information storage medium, and a first controller for controlling a system and outputting display command information at a predetermined display timing; and the receiving side unit including at least a second controller connected to the first controller through the serial communication line and receiving the display command information, an input unit for carrying out route setting, buffer memories for storing the transfer information from the reader and for storing the transfer information related to a route selecting point based on the route setting with enough time margin, a display image memory for extracting and copying a range required for displaying from the transfer information developed on the buffer memories, and a display controller for displaying a detailed image of the route selecting point based on the transfer information on a display unit by a command from the second controller when the second controller receives the display command information.

3. A navigation apparatus for a vehicle in which a transmitting side unit and a receiving side unit are installed at positions remote from each other and both the transmitting side unit and the receiving side unit are connected to each other through a serial communication line, the navigation apparatus characterized by comprising:

the transmitting side unit including at least a present position measuring unit for detecting a present position, a reader for reading transfer information from a map information storage medium, and a first controller for controlling a system and receiving display command information; and the receiving side unit including at least a second controller connected to the first controller through the serial communication line and outputting the display command information, an input unit for carrying out route setting, buffer memories for storing the transfer information from the reader and for storing the transfer information related to a route selecting point based on the route setting, a display image memory for extracting and copying a range required for displaying from the transfer information developed on the buffer memories, and a display controller for outputting the display command information to the first controller to instruct the buffer memory to store the transfer information related to the route selecting point when the route setting by the input unit is completed, and for displaying a detailed image of the route selecting point based on the transfer information on a display unit at a display timing previously determined by the first controller or based on an operation signal from the input unit.

4. A navigation apparatus according to any one of claims 1 to 3, characterized in that the transfer information read by the reader is map data in the vicinity of the present position, the transfer information stored in one of the buffer memories is image data for displaying the route selecting point in the detailed image, an identification number related to the route selecting point is given to the image data, and the display command information is a command including the identification number.

5. A navigation apparatus according to any one of claims 1 to 3, characterized in that the transmitting side unit is positioned at a place remote from a driver's seat of the vehicle, and the receiving side unit is positioned in an inside of a meter unit installed in front of the driver's seat.

6. A navigation apparatus according to 5, characterized in that a controller prepared for controlling the meter unit is also used for the second controller.

* * * * *